United States Patent
Belinky et al.

(10) Patent No.: US 9,981,513 B2
(45) Date of Patent: May 29, 2018

(54) ANTI-RATTLE DEVICE WITH HITCH COVER

(71) Applicant: Horizon Global Americas Inc., Plymouth, MI (US)

(72) Inventors: Jacob S. Belinky, Carleton, MI (US); Russell T. Brzezinski, Berkley, MI (US); Gail R. Matheus, Towanda, KS (US); Jacob L. Hillard, Plainville, KS (US); Austin J. Laurer, South Lyon, MI (US); Mark Scruggs, Walled Lake, MI (US)

(73) Assignee: Horizon Global Americas Inc., Plymouth, MI (US)

( * ) Notice: Subject to any disclaimer, the term of this patent is extended or adjusted under 35 U.S.C. 154(b) by 463 days.

(21) Appl. No.: 14/488,412

(22) Filed: Sep. 17, 2014

(65) Prior Publication Data
US 2015/0076793 A1 Mar. 19, 2015

Related U.S. Application Data

(60) Provisional application No. 61/878,896, filed on Sep. 17, 2013.

(51) Int. Cl.
*B60D 1/58* (2006.01)
*B60D 1/24* (2006.01)
*B60D 1/60* (2006.01)

(52) U.S. Cl.
CPC ............ *B60D 1/241* (2013.01); *B60D 1/605* (2013.01)

(58) Field of Classification Search
CPC ........... B60D 1/241; B60D 1/605; B60D 1/60

USPC .................................................. 280/506, 507
See application file for complete search history.

(56) References Cited

U.S. PATENT DOCUMENTS

| | | | | |
|---|---|---|---|---|
| 5,593,172 A * | 1/1997 | Breslin | .................. | B60D 1/155 280/491.5 |
| 5,988,667 A * | 11/1999 | Young | ..................... | B60D 1/155 280/506 |
| 6,105,989 A * | 8/2000 | Linger | ................... | B60D 1/241 280/506 |
| 6,131,938 A * | 10/2000 | Speer | ..................... | B60D 1/241 24/525 |
| 6,254,072 B1 * | 7/2001 | Bono | ....................... | F16F 1/126 267/220 |
| 6,834,879 B1 * | 12/2004 | Lorman | ................... | B60D 1/06 280/483 |
| 6,874,806 B1 * | 4/2005 | Blake | ..................... | B60D 1/485 150/166 |
| 7,467,804 B2 * | 12/2008 | Ezra | ........................ | B60D 1/52 280/506 |
| 7,600,774 B1 * | 10/2009 | Speer | ..................... | B60D 1/155 280/493 |
| 7,806,425 B2 * | 10/2010 | Chang | .................... | B60D 1/241 280/506 |

(Continued)

*Primary Examiner* — Tony H Winner
(74) *Attorney, Agent, or Firm* — McDonald Hopkins LLC

(57) ABSTRACT

An anti-rattle device is shown and described. The anti-rattle device may include a frame configured to engage a receiver hitch and to receive a draw bar. The anti-rattle device may also include a cam engaging assembly operatively engaged with the frame, where the cam engaging assembly is selectively positionable between disengaged and engaged positions whereby the cam engaging assembly is adapted to engage the draw bar against the receiver hitch in the engaged position.

38 Claims, 14 Drawing Sheets

(56) References Cited

U.S. PATENT DOCUMENTS

| | | | | |
|---|---|---|---|---|
| 7,823,904 | B2* | 11/2010 | Coy | B60D 1/06 |
| | | | | 280/504 |
| 8,079,612 | B1* | 12/2011 | Tambornino | B60D 1/241 |
| | | | | 224/519 |
| 8,596,664 | B2* | 12/2013 | Lahn | B60D 1/06 |
| | | | | 280/495 |
| 9,073,396 | B2* | 7/2015 | Laurer | B60D 1/241 |
| 2002/0145270 | A1* | 10/2002 | Williams | B60B 9/04 |
| | | | | 280/506 |
| 2007/0222184 | A1* | 9/2007 | Christopher | B60D 1/46 |
| | | | | 280/495 |
| 2008/0106066 | A1* | 5/2008 | Varjassy | B60D 1/60 |
| | | | | 280/507 |
| 2009/0014983 | A1* | 1/2009 | McKendry | B60D 1/241 |
| | | | | 280/506 |
| 2009/0102159 | A1* | 4/2009 | Van Laere | B60D 1/60 |
| | | | | 280/507 |
| 2009/0115165 | A1* | 5/2009 | Coy | B60D 1/06 |
| | | | | 280/506 |
| 2010/0096836 | A1* | 4/2010 | Chang | B60D 1/241 |
| | | | | 280/507 |
| 2010/0283225 | A1* | 11/2010 | Lahn | B60D 1/06 |
| | | | | 280/506 |
| 2013/0032620 | A1* | 2/2013 | Prescott | B60R 9/06 |
| | | | | 224/510 |
| 2014/0070518 | A1* | 3/2014 | Sarajian | B60D 1/605 |
| | | | | 280/507 |
| 2014/0327228 | A1* | 11/2014 | Laurer | B60D 1/241 |
| | | | | 280/506 |
| 2015/0328945 | A1* | 11/2015 | Drake | B60D 1/065 |
| | | | | 280/511 |

* cited by examiner

ANTI-RATTLE DEVICE WITH HITCH COVER

CROSS-REFERENCE TO RELATED APPLICATION

This application claims the benefit from U.S. Provisional Patent Application No. 61/878,896 entitled "An Anti-Rattle Device with Hitch Cover" filed on Sep. 17, 2013, which is hereby incorporated in its entirety by reference.

TECHNICAL FIELD

The present invention relates generally to an anti-rattle device, and more specifically to an anti-rattle device with a hitch cover operatively engaging a receiver hitch with a draw bar and reducing rattle therebetween.

BACKGROUND

Many vehicles are equipped with rear or front mounted receiver hitches used for towing of vehicles and as an attachment point for many other cargo accessories. These types of receiver hitches typically include a receiver opening or cavity used for the receipt of a draw bar. The receiver opening comes in various sizes depending upon the towing capabilities thereof. For example, receiver-type trailer hitch assemblies are typically offered with a generally square receiver opening of 1.25 inches (32 mm) for Class I/II, 2 inches (51 mm) for Class III/IV/V, and some Class V hitches are available in 2.5 inches (64 mm) opening sizes.

A draw bar having a shank includes outer dimensions slightly smaller than the internal dimensions of the receiver opening and is normally slidable within the receiver opening. The draw bar is typically connected to the receiver opening by a pin inserted through the two tubular portions thereof and locked or clipped to prevent removal of the draw bar from the receiver hitch. The two components are both toleranced to ensure that the draw bar can be freely inserted and removed from the receiver opening.

The draw bar may include a standard ball-mount for engaging with the coupler of a towed vehicle or other wheeled vehicle. Another popular use for receiver hitches is the use as a coupling device for installing cargo accessory such as equipment racks onto the vehicle. Bicycle carrier racks, ski carriers, storage boxes and other types of carriers have been designed to use the above-described draw bar to engage within a receiver opening. This provides a universal system that allows a vehicle operator to use various towed vehicles and accessory carriers with a single coupling system.

A particular problem with the use of these receiver hitches is the clearance between the internal dimensions of the receiver opening and the external dimensions of the draw bar. The tubular portions thereof by necessity must have sufficient clearance to be able to be easily telescoped together. However, this clearance between the two tubular portions allows relative movement between them. The draw bar tends to rattle or chatter within the receiver opening during use. This rattle or chatter can be a distraction to the driver and can cause premature wear to the components.

A need is therefore identified for an improved apparatus whereby the movement between the receiver hitch and the draw bar is minimized when they are operatively secured together. Further, there is a need for an anti-rattle apparatus that is easy to operate and is effective. Further still, there is a need for an anti-rattle device with a cover for generally protecting the receiver opening of the receiver hitch when the draw bar is not attached thereto.

SUMMARY

An anti-rattle device is shown and described. The anti-rattle device may include a frame configured to engage a receiver hitch and to receive a draw bar. The anti-rattle device may also include a cam engaging assembly operatively engaged with the frame, where the cam engaging assembly is selectively positionable between disengaged and engaged positions whereby the cam engaging assembly is adapted to engage the draw bar against the receiver hitch in the engaged position.

A system may include a receiver hitch configured to be attached with a vehicle, a draw bar telescopingly engaged with the receiver hitch, and an anti-rattle device engaged with the receiver hitch. The anti-rattle device may include a frame telescopingly engaging the receiver hitch, the frame having an opening receiving the draw bar. The anti-rattle device may also include a cam engaging assembly operatively engaged with the frame, where the cam engaging assembly is positionable between disengaged and engaged positions whereby the cam engaging assembly engages the draw bar against the hitch receiver in the engaged position.

An accessory mounting assembly configured to be selectively secured with a receiver hitch may include a draw bar configured to telescopingly engage the receiver hitch, and an anti-rattle device. The anti-rattle device may include a frame having a cam aperture and an opening to receive the draw bar, and a cam lever mount positionable within the cam aperture. The anti-rattle device may also include a plunger engaged with the cam lever mount and positionable relative to the cam lever mount, where the plunger is positionable between disengaged and engaged positions whereby the plunger engages the draw bar against the receiver hitch in the engaged position.

An anti-rattle device may include a frame configured to engage a receiver hitch and to receive a draw bar, an isolator configured to engage the receiver hitch, where the frame circumscribes the isolator and the isolator is configured to dampen movement between the draw bar and receiver hitch. The anti-rattle device may also include a cam lever operatively secured with the frame, the cam lever positionable between disengaged and engaged positions whereby at least a portion of the cam lever is engageable with the receiver hitch deflecting the isolator between the draw bar and receiver hitch in the engaged position.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
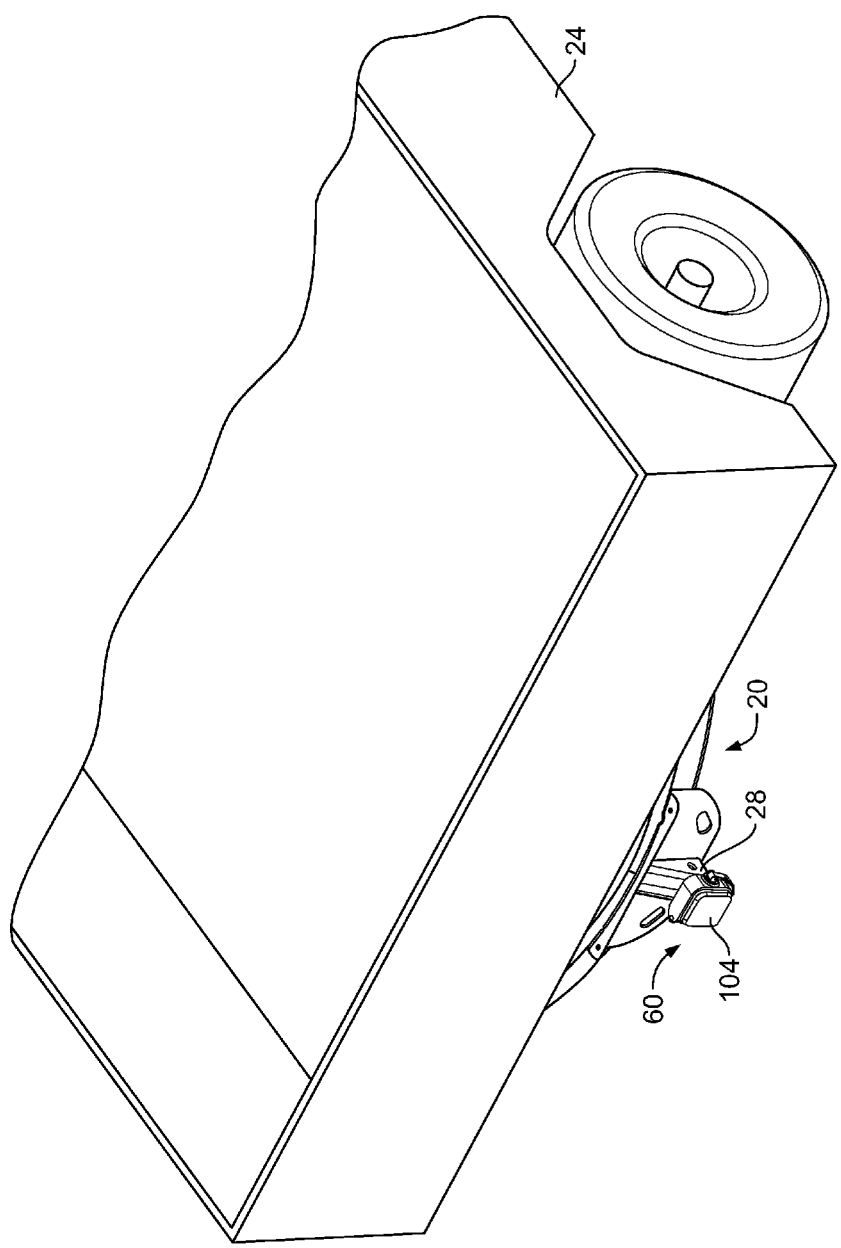
FIG. 1 is a perspective view of an anti-rattle device operatively engaged with a receiver hitch attached to a vehicle

Reference is now made to FIG. 1 illustrating exemplary embodiments of a receiver hitch 20 that may be operatively attached with a vehicle 24 in any appropriate manner. The receiver hitch 20 may be of any appropriate configuration. The present teachings are not limited to the receiver hitch 20 shown and described herein—any current or newly developed receiver hitch may be utilized. The receiver hitch 20 may be attached to a frame (not shown) of the vehicle 24, such as through use of fasteners or the like. As illustrated the receiver hitch 20 may include a receiver tube 28 adapted to selectively accept a draw bar of an appropriate shape and size as described in more detail below.

Figure 2:
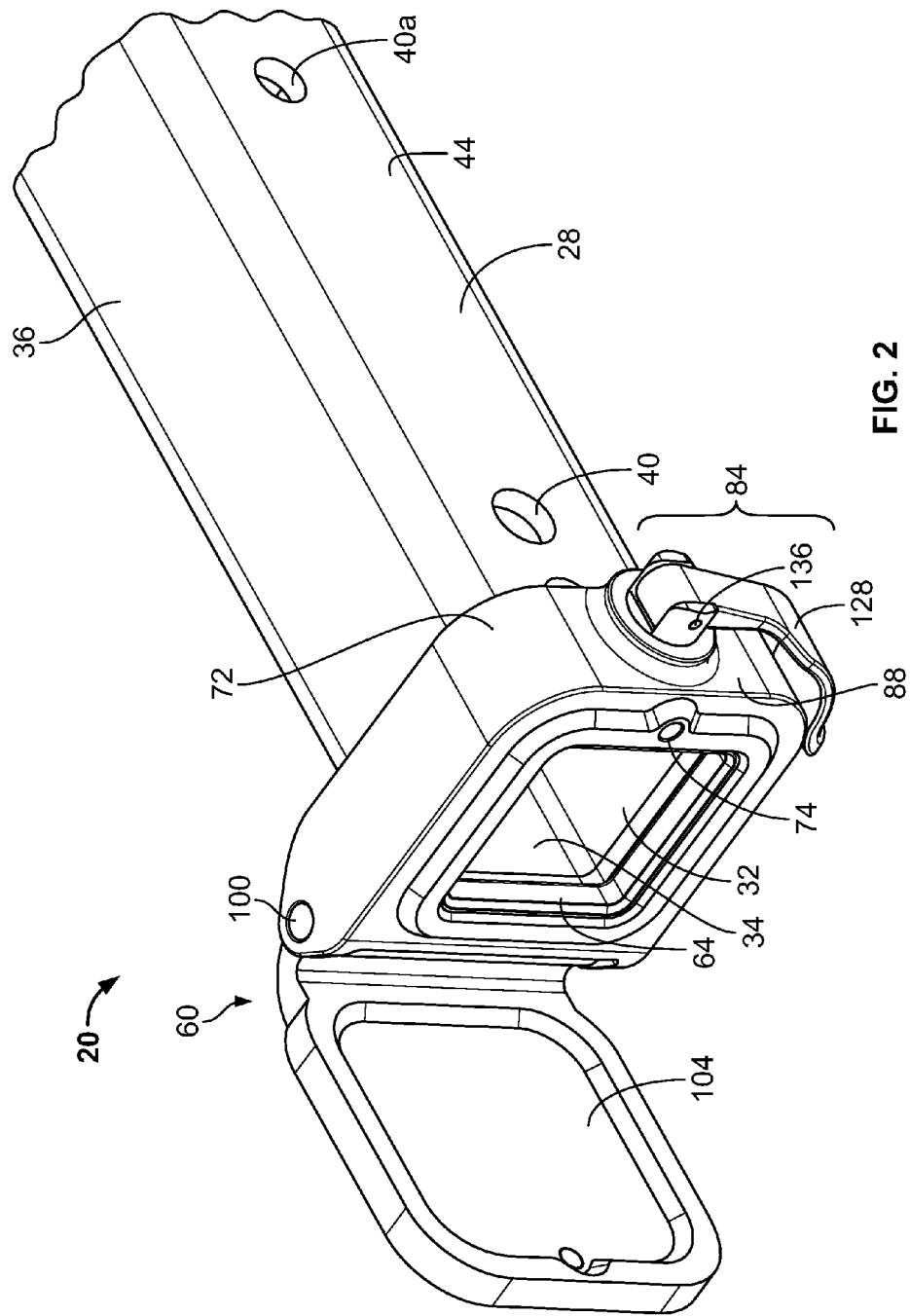
FIG. 2 is a perspective view of embodiments of an anti-rattle device operatively engaging a receiver hitch.
Figure 3:
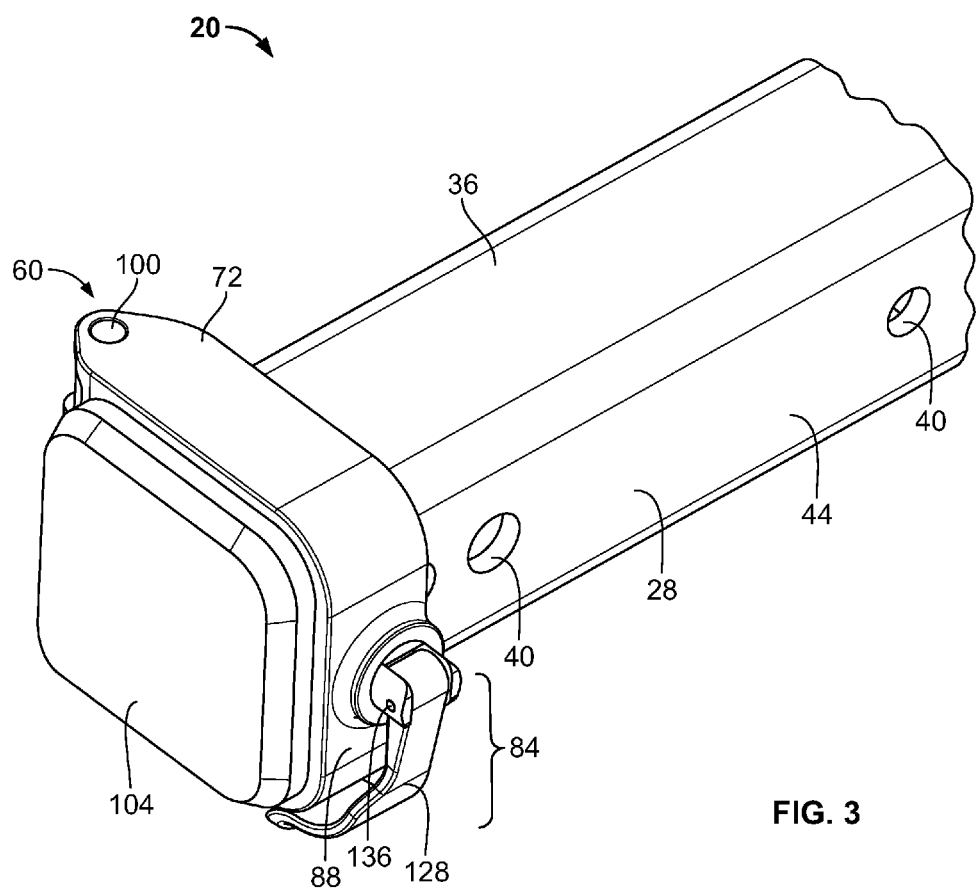
FIG. 3 is a perspective view of embodiments of the anti-rattle device with the cover in a closed position.

The receiver tube 28 may be mounted to the receiver hitch 20 by any appropriate mounting techniques, such as by way of non-limiting examples, fastening or welding. In some embodiments, the receiver tube 28 may include a generally square receiver opening 32 of approximately 1.25 inches (32 mm) for Class I/II, 2 inches (51 mm) for Class III/IV/V, or 2.5 inches (64 mm) for class V. It is to be expressly understood that other sizes or shapes of the receiver tube 28 and receiver opening 32 may be used without departing from the present teachings—see FIG. 2.

The receiver tube 28 may include an interior portion 34 and an exterior portion 36—the interior portion 34 may terminate at the receiver opening 32. The receiver tube 28 may also include at least two apertures 40 disposed from one another. By way of a non-limiting example, the apertures 40 may be generally aligned—such as axially aligned—on opposing sides 44 of the receiver tube 28. The apertures 40 may extend entirely through the sides 44 and may be configured to receive a pin 41 of any appropriate configuration. In some embodiments, the receiver tube 28 may include an additional set of apertures 40a disposed from one another. However, the present teachings are not limited to this configuration. Any appropriate number of apertures may be used without departing from the present teachings.

Figure 4:
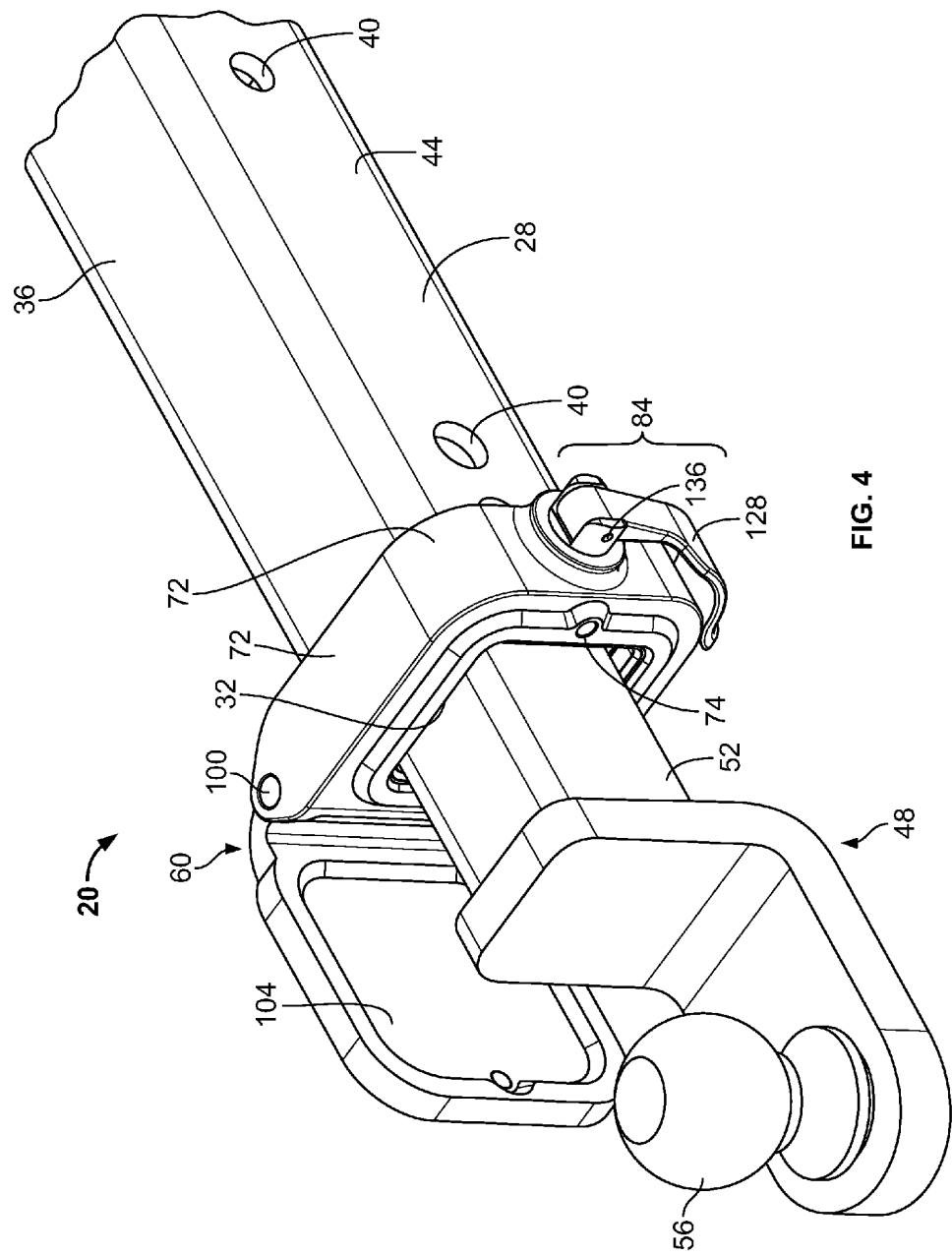
FIG. 4 is a perspective view of the anti-rattle device operatively engaging a receiver hitch with a draw bar being telescoped in the receiver hitch.

A draw bar 48 of any appropriate configuration may be selectively engaged with the receiver hitch 20—see FIG. 4. The present teachings are not limited to the configuration shown and described. The draw bar 48 may include an exterior portion 52 having a generally corresponding shape to that of the interior portion 34 of the receiver tube 28. The draw bar 48 may also have an external size or shape slightly less than the internal size or shape of the receiver tube 28. This may enable the draw bar 48 to be inserted within the receiver tube 28 in a telescoping manner, as shown in FIG. 4. By way of a non-limiting example, the difference in the dimensions of the interior portion 34 of the receiver tube 28 and the exterior portion 52 of the draw bar 48 may be about one-sixteenth of an inch—although the teachings are not limited to this dimension. This dimensional difference may allow the draw bar 48 to be easily inserted or telescoped within the receiver tube 28. It should be understood that the term draw bar is used throughout to describe the portion that is insertable into the receiver tube 28 and is not limited to a ball mount. The term draw bar as used throughout may be associated with any sort of device, including, without limitation ball mounts, cargo carriers, bicycle racks, ski racks, baskets, storage boxes, lights, steps, and any other types of device that engage a receiver hitch of any appropriate configuration.

As shown, the draw bar 48 may include a trailer hitch ball 56 mounted thereon in any appropriate manner; including, by way of a non-limiting example, via fasteners or welding. Further, the trailer hitch ball 56 may be monolithically formed with the draw bar 48. It is to be expressly understood, however, that the present teachings are not limited to utilizing the draw bar 48 shown and described. In some embodiments, the draw bar 48 may be attached to any appropriately configured cargo accessory, such as bicycle carriers, ski carriers, cargo compartments, platforms, an accessory member, a cargo tray, a pintle mount and other types of receiver hitch-mounted devices.

Regardless of the accessory or ball mount utilized with the draw bar 48, the draw bar 48 may be inserted into the interior portion 34 of the receiver hitch 20. A pin (not shown) may be utilized to be inserted into the apertures 40 of the receiver hitch 20 and the draw bar 48 may include correspondingly aligned apertures (not shown) through which the pin may be inserted. The pin may operatively secure the draw bar 48 with the receiver hitch 20. However, it should be understood that the present teachings are not limited to this configuration. The draw bar 48 may be operatively secured with the receiver hitch 20 in any appropriate manner.

As shown in FIGS. 2-7, an anti-rattle device 60 may be operatively engaged with the receiver hitch 20 in any appropriate manner. In some embodiments, the anti-rattle device 60 when operatively engaged with the receiver hitch 20 may apply a force against the exterior portion 36 of the receiver hitch 20 so that relative movement between the receiver hitch 20 and the draw bar 48 is minimized or even eliminated. Eliminating the relative movement may generally eliminate the rattling that may otherwise be present. This may reduce the perceptible noise to the operator during operation and may reduce the wear on the draw bar 48 and receiver hitch 20.

The anti-rattle device 60 may be of any appropriate configuration. In some embodiments, and as shown in more detail in FIG. 5, the anti-rattle device 60 may include an isolator 64 of any appropriate shape and size. The isolator 64 may be made any suitable material, including, by way of a non-limiting example an elastomeric material such as rubber. The isolator 64 may be operatively secured to the receiver hitch 20 by any appropriate manner. By way of a non-limiting example, the isolator 64 may be telescopingly engaged with the receiver hitch 20 and fastened, snap-fit, welded, adhered or the like thereto.

The isolator 64 may include an opening 68 of such a shape and size that may generally be similar to that of the receiver opening 32. The opening 68 may further be of a shape and size such that the draw bar 48 may be telescopingly inserted therethrough. Further, the isolator 64 may include a cut-out portion 70. In some embodiments, the isolator may include cut-out portions 70 on opposed sides of the isolator 64. The cut-out portion 70 may be integrally formed with the isolator 64 or may be formed through a subsequent operation. The cut-out portion 70 may be of a shape and size to provide clearance for certain components of the anti-rattle device 60 described in more detail below.

The anti-rattle device 60 may further include a frame 72. The frame 72 may be layered upon the isolator 64, i.e., the frame 72 may telescopingly engage with the isolator 64. Further, the frame 72 may be secured to the receiver hitch 20 by any appropriate manner, including, without limitation, being fastened, snap-fit, welded, adhered or the like. By way of a non-limiting example, fastener may be utilized to secure the frame 72 to the receiver hitch 20. The frame 72 may be made of any appropriate material, including, without limitation of plastic, metal, elastomeric materials, or any other suitable material. The frame 72 may include an opening 76 of such a shape and size that may generally be similar to that of the receiver opening 32 and/or the opening 68 of the isolator 64; provided, however, the teachings are not limited to this configuration. The openings 32, 68, and 76 may be different shapes and sizes. The opening 76 may further be of a shape and size such that the draw bar 48 may be telescopingly inserted therethrough. Further, the frame 72 may be configured to telescopingly engage the draw bar 48. The present teachings are not limited to the configuration shown.

Frame 72 may further include a cam aperture 80 of any appropriate shape and size. The cam aperture 80 may be of a configuration to receive a cam engaging assembly 84. The cam aperture 80 may be positioned on the frame 72 in any appropriate location. While the cam aperture 80 is shown as being on a side portion 88 of the frame 72, the present teachings are not limited to such. By way of a non-limiting example, the cam aperture 80 may be positioned on a top or bottom portion of the frame 76, on an opposed side of the frame 72 from that shown, or may be located on any of such positions or all of such positions. The cam aperture 80 may include a threaded portion 92. As shown, the threaded portion 92 may be a female threaded portion; however, the present teachings are not limited to such. The threaded portion 92 in some embodiments may be a male threaded portion.

The frame 72 may further include a pin aperture 96 on any appropriate position on the frame 72. The pin aperture 96 may be of any appropriate configuration. By way of a non-limiting example, the pin aperture 96 may be configured to receive a cover pin 100 as described in more detail below.

The anti-rattle device 60 may further include a cover 104. The cover 104 may be made of any appropriate material, including, without limitation elastomeric material, plastic, rubber, metal or any other suitable material. Additionally, the cover 104 may be integrated with a logo, indicia, design, reflector, lights, or other embellishment as described in more detail below. Further, the cover 104 may include helpful information regarding use, installation and maintenance of the anti-rattle device 60 within an inside portion of the cover 104. The cover 104 may be moveably engaged with the frame 72 in any appropriate manner.

In some embodiments, the cover 104 may include a sleeve 108 of any appropriate configuration—such as of a configuration to receive the cover pin 104. In such embodiments, the cover 104 may be pivotally attached to the frame 72. The cover 104 may be aligned with the frame 72 such that the pin aperture 96 is generally aligned with the sleeve 108. The cover pin 100 may be inserted in and through the pin aperture 96 and sleeve 108. This may result in the cover 104 being pivotally attached with the frame 72. Further, a magnet 74 may be attached with the frame 72 such that when the cover 104 is pivoted to a closed position, the magnet 74 may keep the cover 104 in a generally closed position. It should be understood, however, that the cover 104 may be attached with the frame 72 in any appropriate manner and is not limited to that shown and described herein. By way of a non-limiting example, the cover 104 may be tethered with the frame 72.

Figure 5:
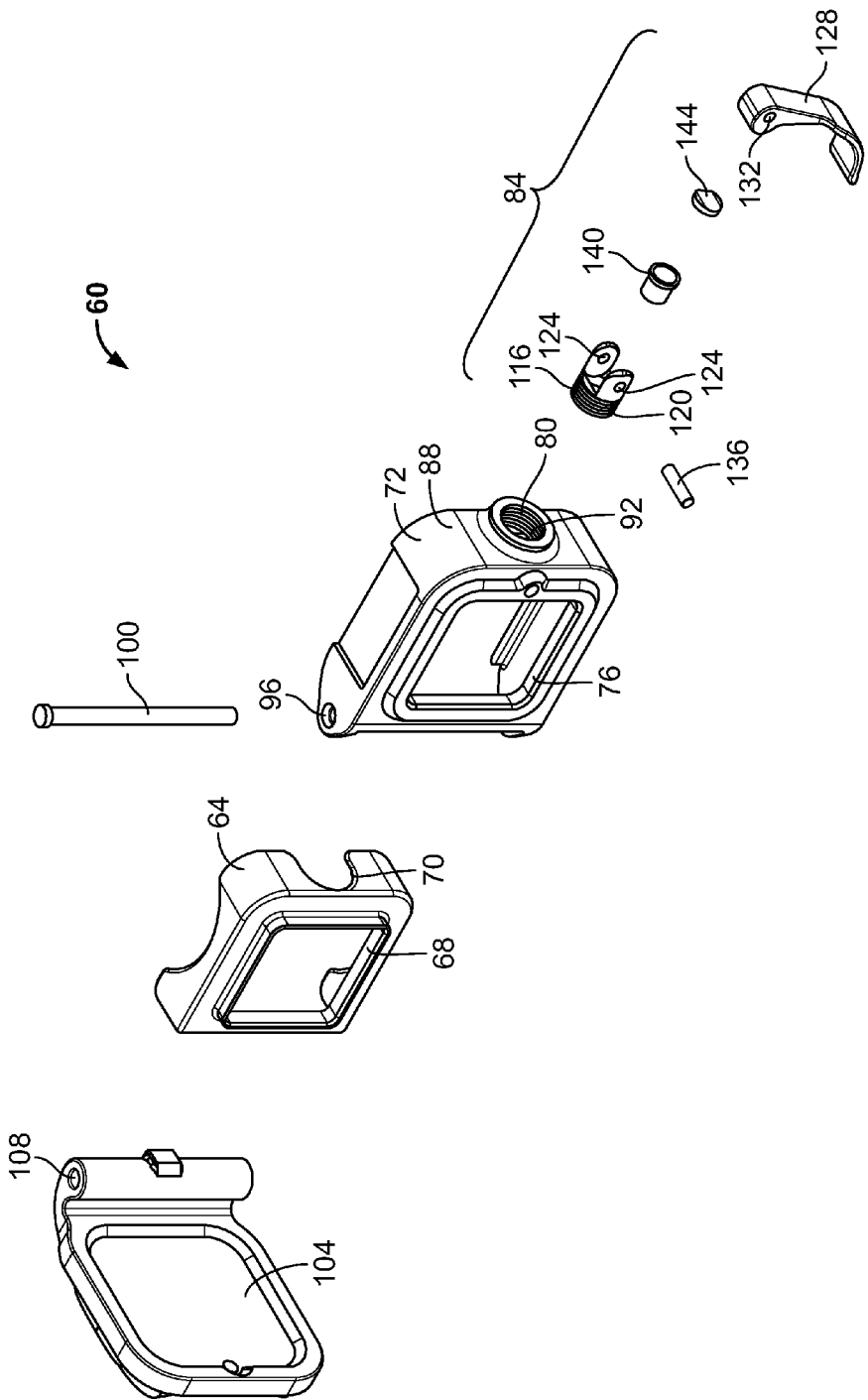
FIG. 5 is an exploded view of the anti-rattle device.
Figure 6:
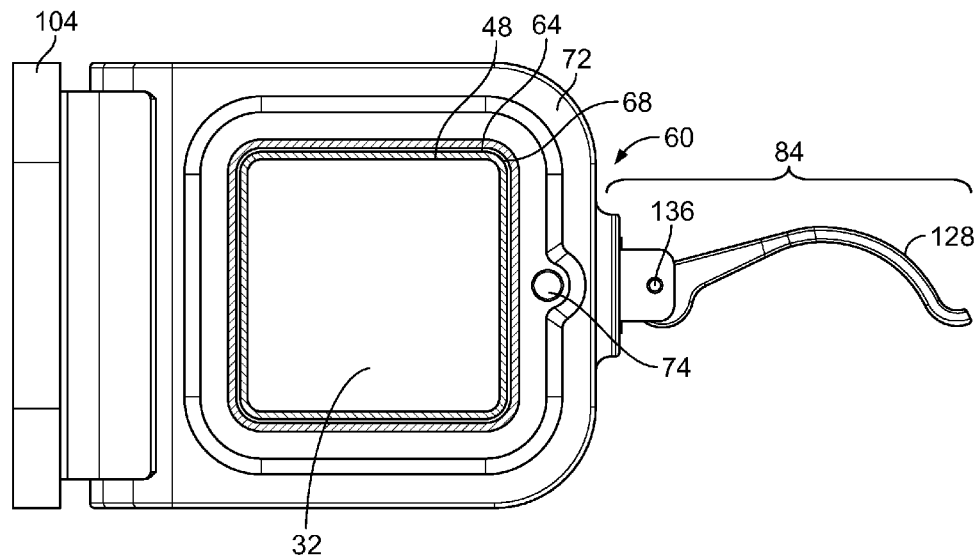
FIG. 6 is a front view of the anti-rattle device in a disengaged position on the receiver hitch.
Figure 7:
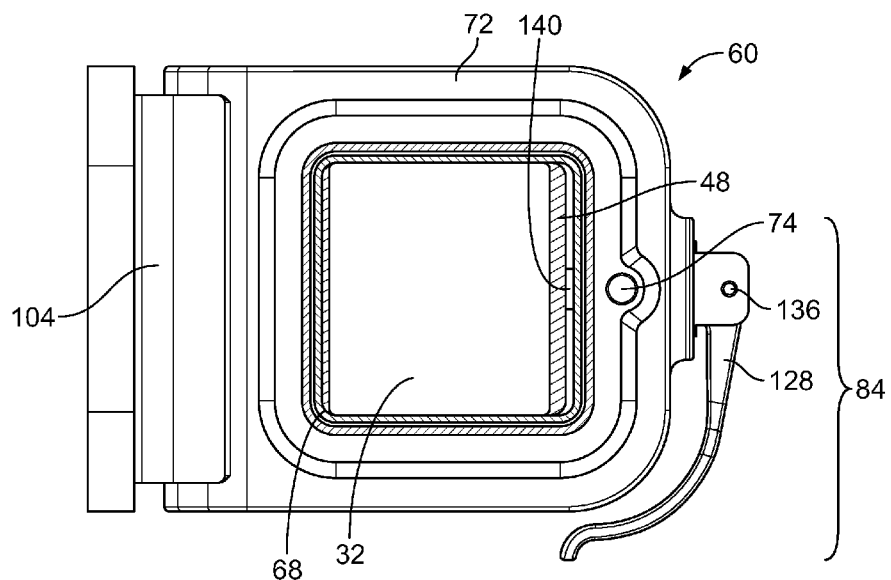
FIG. 7 is a front view of the anti-rattle device in an engaged position on the receiver hitch.

The anti-rattle device 60 may include the cam engaging assembly 84 operatively engaged with the frame 72 previously noted above. The cam engaging assembly 84 may include a cam lever mount 116. The cam lever mount 116 may selectively and adjustably engage or otherwise be fixed with the cam aperture 80. In some embodiments, the cam lever mount 116 may include a threaded portion 120 configured to engage the threaded portion 92 of the cam aperture 80. By way of a non-limiting example, the threaded portion 120 may be configured as male threaded member and the threaded portion 92 may be configured as a female threaded member. In such embodiments, the male threaded member 120 may selectively and adjustably engage the female threaded member 92. Further, in such embodiments, the position of the cam lever mount 116 may be adjusted relative to the cam aperture 80 such as by threading the cam lever mount 116 inward or outward of the cam aperture 80 as required or desired. Adjusting the position of the cam lever mount 116 may adjust the amount of engagement of the cam engaging assembly 84 relative the receiver hitch 20. Further, the cam lever mount 116 may include at least one aperture 124. By way of a non-limiting example, the cam lever mount 116 may include a pair of apertures 124 as shown in FIG. 5.

The cam engaging assembly 84 may further include a cam lever 128 operatively engaged with the cam lever mount 116. The cam lever 128 may be operatively engaged with the cam lever mount 116 in any appropriate manner. By way of a non-limiting example, the cam lever 128 may include at least one aperture 132—as shown in FIG. 5 the cam lever 128 may include an aperture 132 extending therethrough. In such embodiments, the apertures 124 and 132 of the cam lever mount 116 and cam lever 128, respectively, may be generally aligned. A cam lever pin 136 may be inserted into and through the apertures 124, 132 such that the cam lever 128 is pivotally attached with the cam lever mount 116. Further, the cam lever 128 may be rotatable relative to the frame 72 such that rotation of the cam lever 128 may rotate the cam lever mount 116 within the cam aperture 80. This rotation may operably position the amount of engagement of the cam engaging assembly 84 relative the receiver hitch 20.

The cam engaging assembly 84 may further include a plunger 140. The plunger 140 may be operatively engaged with the cam lever mount 116 in any appropriate manner. In some embodiments, the plunger 140 may be operatively positioned between the cam lever mount 116 and the cam lever 128, with the cam aperture 80 generally retaining the plunger 140 in an operative position. The plunger 140 may be selectively positionable relative to the cam lever mount 116 to engage and disengage the receiver hitch 20.

The anti-rattle device 60 may further include a clamping member 144. The clamping member 144 may be made of any appropriate material, including, without limitation being a generally elastomeric material, rubber, plastic or the like. The clamping member 144 may be positioned between the plunger 140 and cam lever 128. The clamping member 144 may provide an engagement surface for the cam lever 128 during operation. The clamping member 144 may be of a shape and size such that when the cam lever 128 is in the engaged position, the clamping member 144 may generally restrict movement, e.g., pivoting, of the cam lever 128 from the engaged position.

In operation, the operator may secure the anti-rattle device 60 with the receiver hitch 20. The operator may insert the draw bar 48 into and through the openings 32, 68, and 76. Although, it should be understood that in some embodiments, the operator may insert the draw bar 48 into the receiver hitch 20 and then operatively secure the anti-rattle device 60. The present teachings are not limited to a specific order of attachment. The operator may manually actuate the cam lever 128 from the position shown in FIG. 6 to that shown in FIG. 7. Upon such actuation of the cam lever 128, the plunger 140 may apply a force against the exterior portion 36 of the receiver hitch 20. This force may minimize or eliminate relative movement between the receiver hitch 20 and the draw bar 48. Eliminating or minimizing the relative movement may generally eliminate the rattling that may otherwise be present resulting in the dampening of noise that may otherwise occur during operation of the vehicle 24. Further, the isolator 64 may be made of material such that it may act to dampen relative movement between the draw bar 48 and receiver hitch 20. This may further generally eliminate the rattling that may otherwise be present. Still further, the anti-rattle device 60 may generally prevent premature wear between the receiver hitch 20 and draw bar 48.

Additional embodiments of an anti-rattle device according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired anti-rattle device without departing from the spirit and scope of the present invention.

Figure 8:
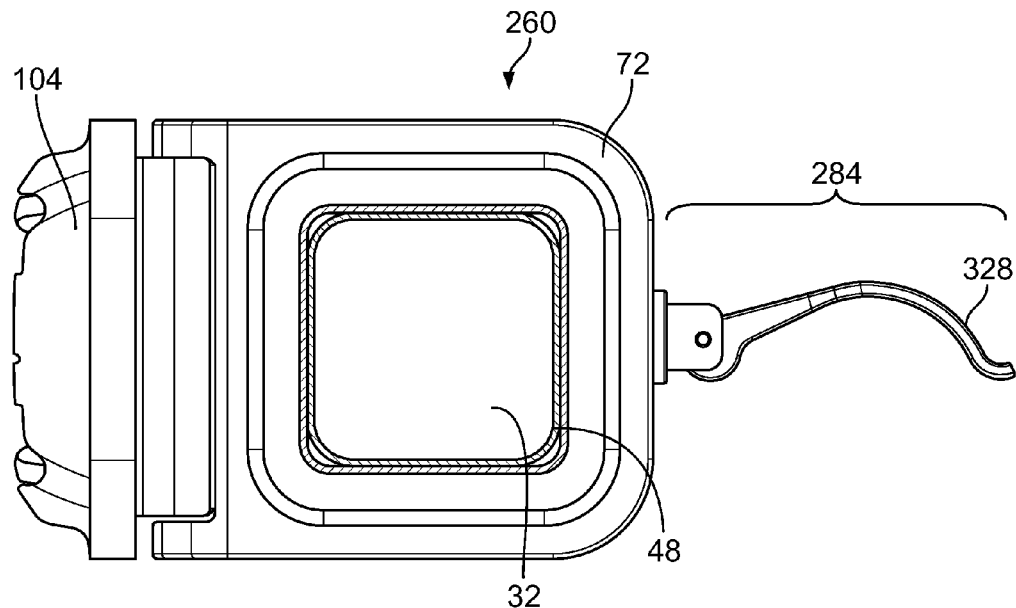
FIG. 8 is a front view embodiments of an anti-rattle device in a disengaged position on the receiver hitch.
Figure 9:
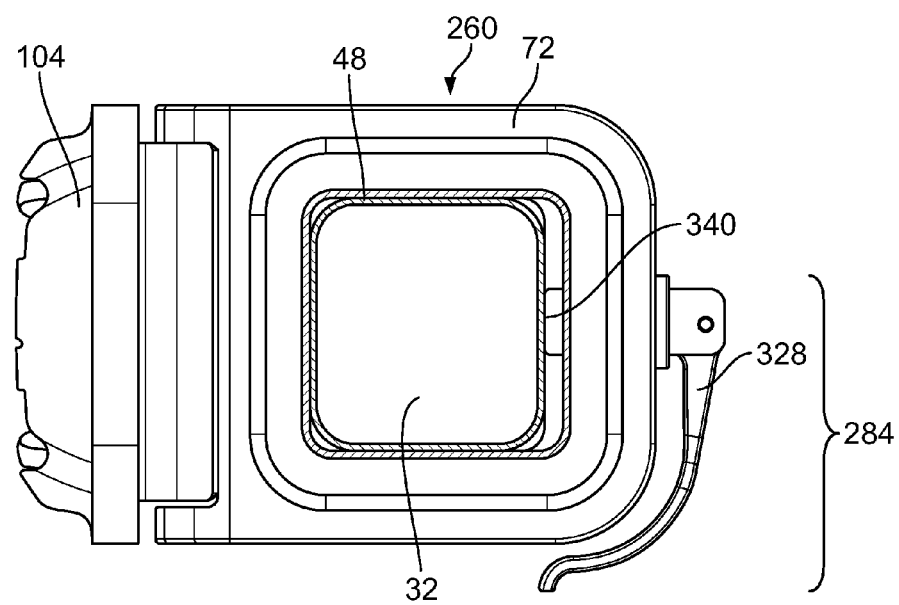
FIG. 9 is a front view of embodiments of the anti-rattle device in an engaged position on the receiver hitch.

An anti-rattle device 260 as shown in FIGS. 8-9 may be operatively attached with the receiver hitch 20 in any appropriate manner. The anti-rattle device 260 may be of a configuration similar to the anti-rattle device 60. However, the anti-rattle device 260 may include a cam engaging assembly 284 having a plunger 340 configured to extend further towards the draw bar 48 during operation. The plunger 340 may be particularly effective when the circumference of the draw bar 48 is considerably less than that of the receiver opening 32. In such embodiments, for example, movement of the cam lever 328 from a disengaged position, as shown in FIG. 8, to an engaged position, as shown in FIG. 9, may engage the plunger 340 against the draw bar 48. This engagement may apply a force against the draw bar 48 so that relative movement between the receiver hitch 20 and the draw bar 48 is minimized or even eliminated. Eliminating the relative movement may generally eliminate the rattling that may otherwise be present.

Figure 10:
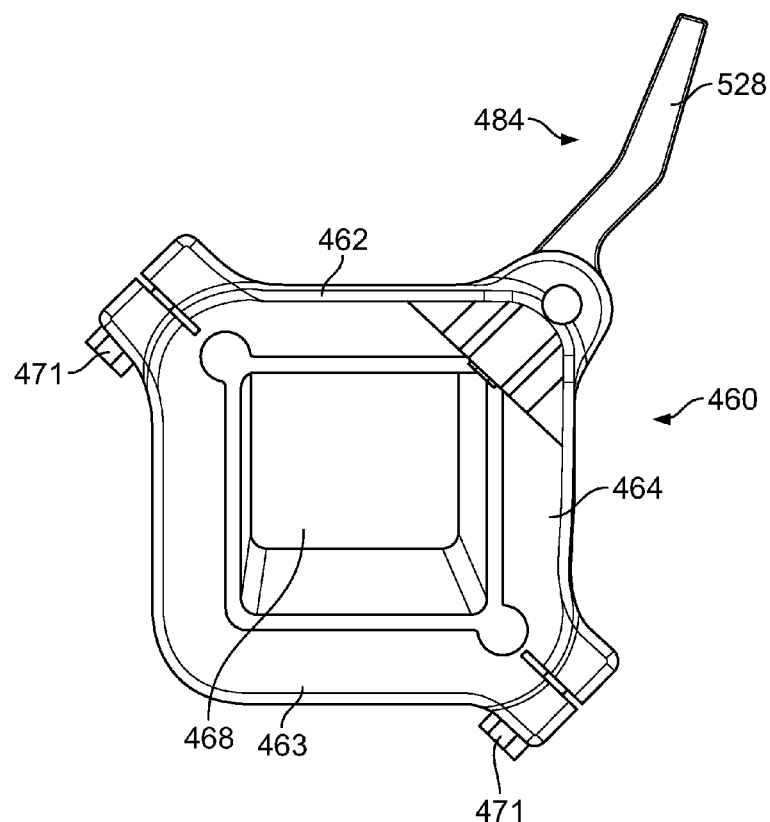
FIG. 10 is a front view of embodiments of an anti-rattle device in a disengaged position on a receiver hitch.
Figure 11:
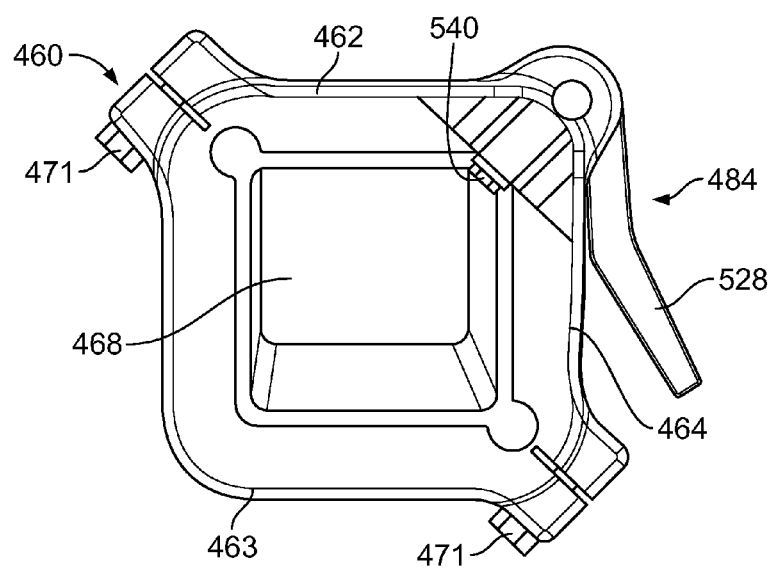
FIG. 11 is a front view of embodiments of the anti-rattle device in an engaged position on the receiver hitch.

An anti-rattle device 460 as shown in FIGS. 10-11 may be operatively attached with the receiver hitch 20 in any appropriate manner. The anti-rattle device 460 may include a frame 462 having an opening 468—the opening 468 configured to receive the draw bar 48. The frame 462 may be formed from two frame components 463, 464 that may be operatively attached together such as through the use of fasteners 471. It should be understood, however, that the frame 462 may be monolithically formed as a single piece. Further, the frame 462 may be formed from more than two frame members. Further still, the frame members 463, 464 may be attached in any appropriate manner, including, without limitation via welding, adhesives, or the like.

The anti-rattle device 460 may include a cam engaging assembly 484 operatively coupled with the frame 462 in any appropriate manner. The cam engaging assembly 484 may include a cam lever 528 operatively and moveably engaged with the frame 462. In some embodiments, the cam lever 528 may be pivotally attached with the frame 462; provided, however, the present teachings are not limited to this configuration—the cam lever 528 may actuate in any appropriate manner. The cam engaging assembly 484 may further include a plunger 540. The plunger 540 may be operatively engaged with the cam lever 528 in any appropriate manner. In some embodiments, the plunger 540 may be selectively positionable relative to the frame 462 to engage and disengage the draw bar 48. By way of a non-limiting example, movement of the cam lever 528 from a disengaged position, as shown in FIG. 10, to an engaged position, as shown in FIG. 11, may engage the plunger 540. In the engaged position, the plunger 540 may engage the draw bar 48. This engagement may apply a force against the draw bar 48 so that relative movement between the receiver hitch 20 and the draw bar 48 is minimized or even eliminated. Eliminating the relative movement may generally eliminate the rattling that may otherwise be present.

Figure 12:
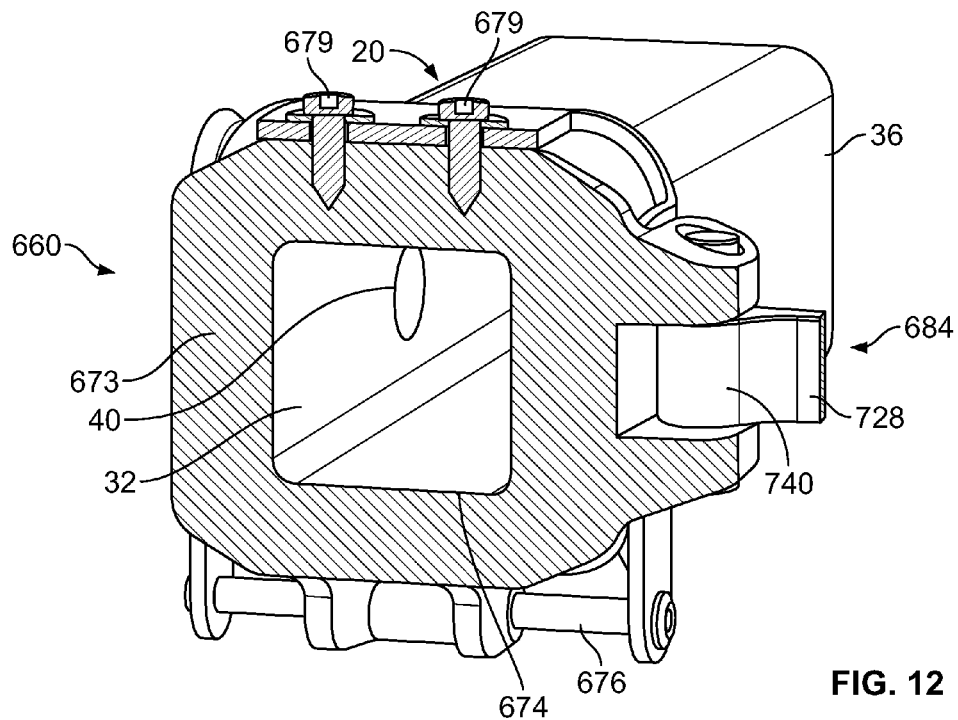
FIG. 12 is a cross-sectional view of embodiments of an anti-rattle device in a disengaged position on a receiver hitch.
Figure 13:
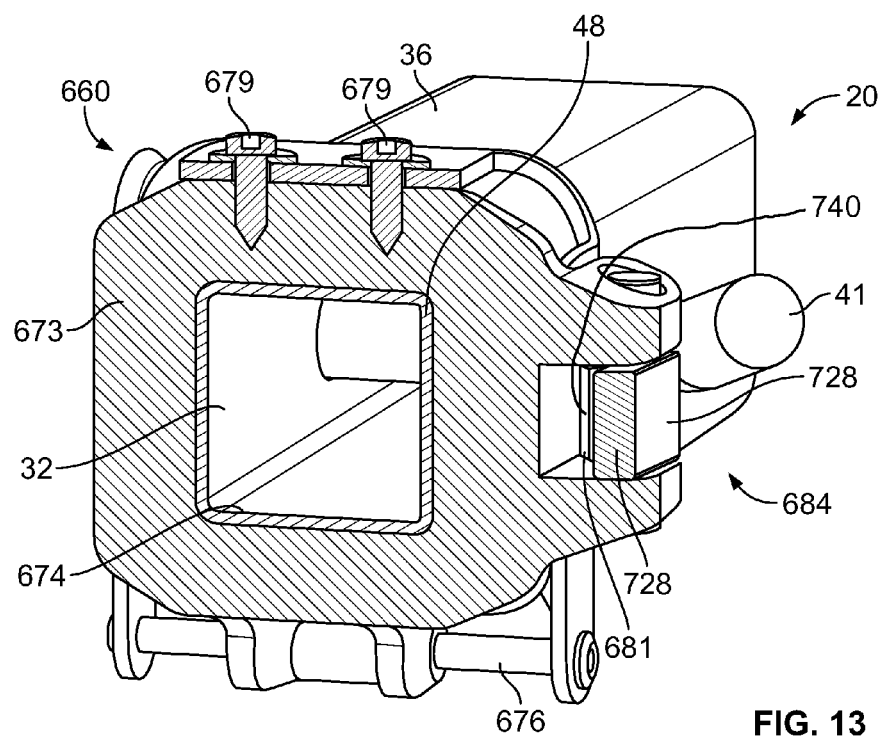
FIG. 13 is front a view of embodiments of the anti-rattle device in an engaged position on the receiver hitch.

An anti-rattle device 660 as shown in FIGS. 12-13 may be operatively attached with the receiver hitch 20 in any appropriate manner. The anti-rattle device 660 may include a collar 673. The collar 673 may telescopingly engage with the receiver hitch 20. The collar 673 may be formed of any appropriate material, including, without limitation die-cast or extruded aluminum. The anti-rattle device 660 may include a generally thin wall interior elastic sleeve 674 that may be positioned generally between the anti-rattle device 660 and the receiver hitch 20 to prevent rattling.

The anti-rattle device 660 may further include a mounting bracket 676 positioned on a lower portion of the receiver hitch 20 that may be made of any appropriate material, including, without limitation of steel. The mounting bracket 676 may operatively attach the collar 673 with the receiver hitch 20. In some embodiments, the anti-rattle device 660 may include a cover (not shown) that may be secured with the mounting bracket 676 in any appropriate manner. The anti-rattle device 660 may include at least one fastener 679 further securing collar 673 with the receiver hitch 20. By way of a non-limiting example, the fastener may include a plurality of self locking fasteners 679 and associated plastic washers. However, the present teachings are not limited to this configuration any appropriate configuration of fasteners may be used without departing from the present teachings.

The anti-rattle device 660 may include a cam engaging assembly 684 operatively coupled with the collar 673 in any appropriate manner. The cam engaging assembly 684 may include a cam lever 728 operatively and moveably engaged with the collar 673. In some embodiments, the cam lever 728 may be pivotally attached with the collar 673; provided, however, the present teachings are not limited to this configuration. The cam engaging assembly 684 may further include an engagement portion 740. The engagement portion 740 may be selectively positionable relative to the collar 673 to engage and disengage the receiver hitch 20 in any appropriate manner. By way of a non-limiting example, movement of the cam lever 728 from a disengaged position, as shown in FIG. 12, to an engaged position, as shown in FIG. 13. In the engaged position, the cam lever 728 may engage the engaging portion 740 with the receiver hitch 20. This engagement may slide the collar 673 toward the engaged position so that relative movement between the draw bar 48 and receiver hitch 20 is minimized or even eliminated. Eliminating the relative movement may generally eliminate the rattling that may otherwise be present. In some embodiments, the anti-rattle device 660 may include plastic bushings 681 between the collar 673 and cam lever 728. This may be particularly effective when the circumference of the draw bar 48 is less than that of the receiver opening 32.

Figure 14:
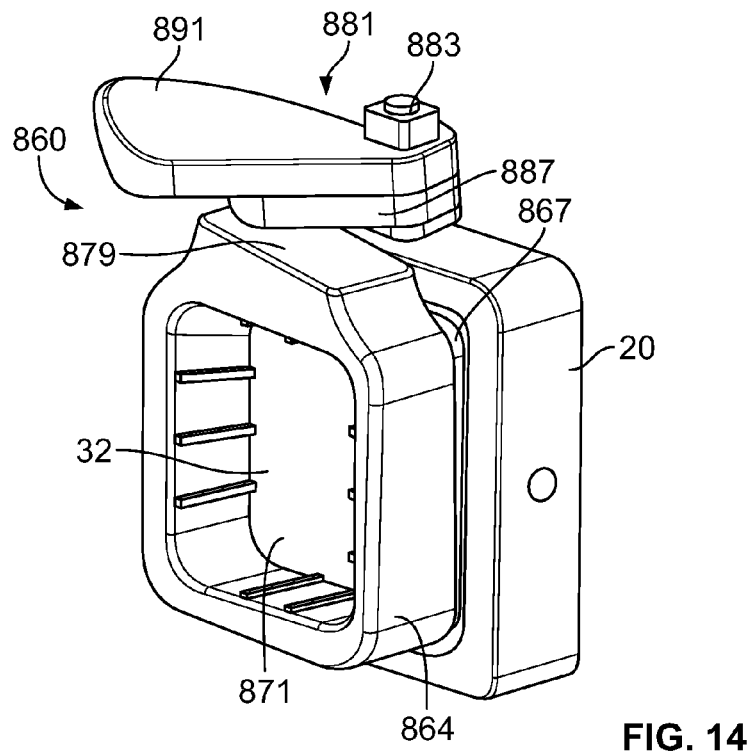
FIG. 14 is a perspective view of embodiments of an anti-rattle device.

An anti-rattle device 860 as shown in FIG. 14 may be operatively attached with the receiver hitch 20 in any appropriate manner. The anti-rattle device 860 may include a collar 864. The collar 864 may include a portion 867 that may telescopingly engage with the receiver hitch 20. By way of a non-limiting example, the portion 867 may have a circumference that is less than that of the remaining portion of the collar 864. In such embodiments, such portion 867 may be inserted into the receiver opening 32 and may be generally of a shape and size to remain positioned within the receiver opening 32 while the remaining portion of the collar 864 is adjacent to the receiver hitch 20. The collar 864 may further include an opening 871 that may be shaped and sized such that the draw bar 48 may be telescopingly engaged therewith. The collar 864 may be formed of any appropriate material, including, without limitation die-cast or extruded aluminum.

The anti-rattle device 860 may include a camming surface 879. In some embodiments and as shown in FIG. 14, the camming surface 879 may be positioned generally on a top portion of the collar 864. It should be understood, however, that the camming surface may be positioned in any appropriate location on the collar 864, e.g., side portions, bottom portion or any combination of such.

The anti-rattle device 860 may further include a camming member 881. The camming member 881 may be attached with the receiver hitch 20 in any appropriate manner. By way of a non-limiting example, the camming member 881 may be attached through use of fasteners 883. It should be understood, however, that any appropriate method of attachment may be utilized. The camming member 881 may include a mating camming surface 887 that may operatively engage with the camming surface 879 during operation. The camming member 881 may further include a handle 891 that may be attached with the mating camming surface 887. The handle 891 may be of a shape and size such that an operator may utilize such to operatively engage the mating camming surface 879 with the camming surface 887.

In such embodiments, the operator may rotate the handle 891 relative to the fastener 883. As the operator rotates the handle 891 toward an engaged position as shown in FIG. 14, the mating camming surface 887 moves along the camming surface 879. As shown in FIG. 14, the camming surface is ramped upward, which as the handle 891 is rotated, the mating camming surface 887 moves along the ramped camming surface 879. The draw bar 48 may then pushed downward toward and into engagement with the receiver hitch 20. This engagement may apply a force against the draw bar 48 so that relative movement between the receiver hitch 20 and the draw bar 48 is minimized or even eliminated. Eliminating the relative movement may generally eliminate the rattling that may otherwise be present.

It should be understood, however, that instead of the camming surface 879 being ramped, the mating camming surface 887 could be ramped and the camming surface 879 generally planar. Still further, both of the camming surface 879 and the mating camming surface 887 may be ramped. The present teachings are not limited to these configurations any appropriate configuration may be used.

Figure 15:
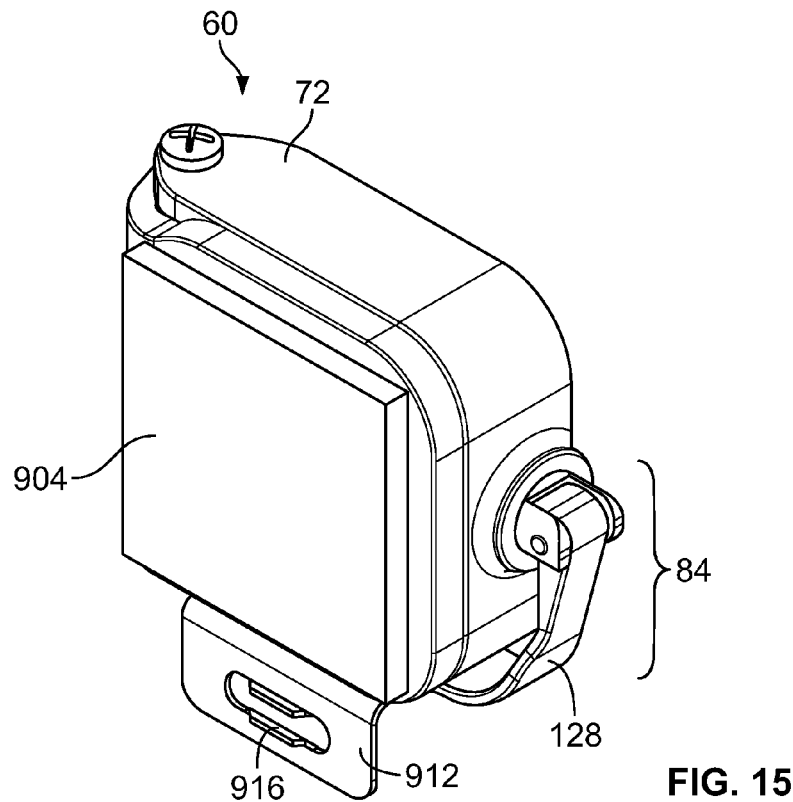
FIG. 15 is a perspective view of embodiments of an anti-rattle device with a cover having a 4-way flat holder operatively engaging a receiver hitch.

As detailed above, the anti-rattle device may include a cover of any appropriate configuration. As shown in FIG. 15, the anti-rattle device 60 may include cover 904. The cover 904 may be secured with the anti-rattle device in any appropriate manner, including, without limitation as detailed above for any of the embodiments or combination of such embodiments. The cover 904 may include an adapter 912. The adapter 912 may be of a configuration to either operatively engage with or generally position a towing vehicle electrical connector (not shown). By way of a non-limiting example, the cover 904 may include a four-way adapter holder 916. In some embodiments, a four-way towing vehicle electrical connector may be attached with the four-way adapter holder 916. The four-way adapter holder 916 may hold the four-way towing vehicle electrical connector. Further, the adapter 912 may include a live four-way adapter socket. In these embodiments, the four-way towing vehicle electrical connector may be operatively attached with the four-way adapter socket. This may permit power from the towing vehicle to be applied to the cover 904, such as to illuminate lights or for any appropriate need.

Figure 16:
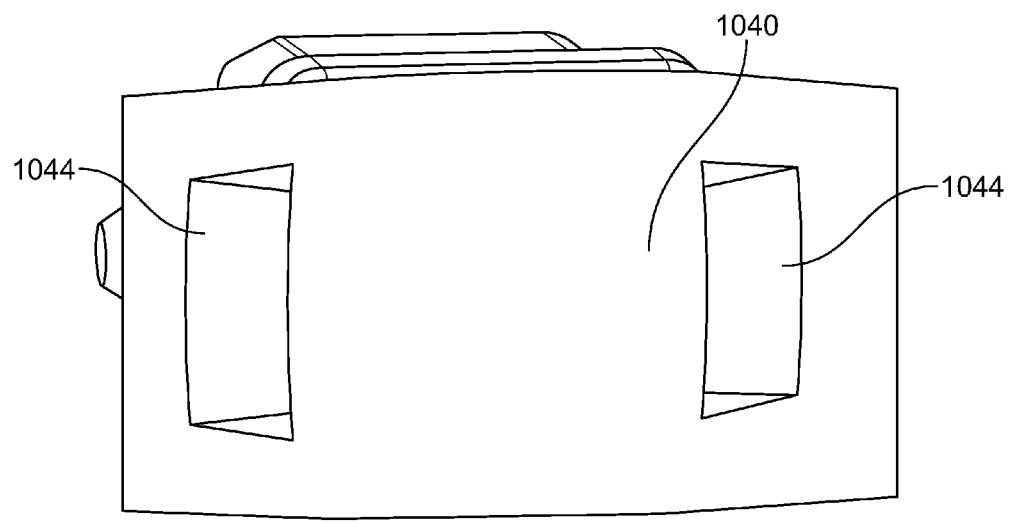
FIG. 16 is a front view of embodiments of an anti-rattle device with a cover in a closed position.

Further, as shown in FIG. 16, the anti-rattle device may include cover 1040. The cover 1040 may be secured with the anti-rattle device in any appropriate manner, including, without limitation as detailed above. The cover 1040 may include an indicia, reflector and/or light 1044. The cover 1040 may include any one or the indicia, reflector or light 1044, a combination of such or may include all of them. The present teachings are not limited to a specific configuration. In some embodiments, the cover 1040 may include lights 1044. In these embodiments, the towing vehicle electrical connector may operatively attach with the cover 1040 such that it may provide power to the cover 1040 in order to operate the lights 1044.

Figure 17:
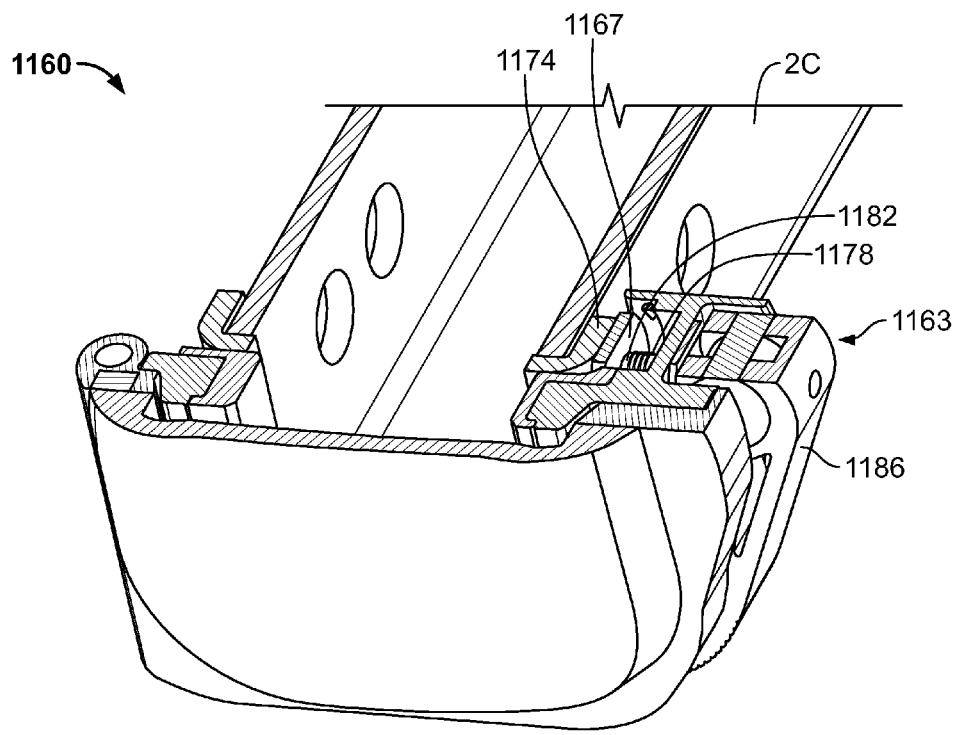
FIG. 17 is a cross-sectional view of embodiments of an anti-rattle device in an engaged position with a cover in a closed position.
Figure 18:
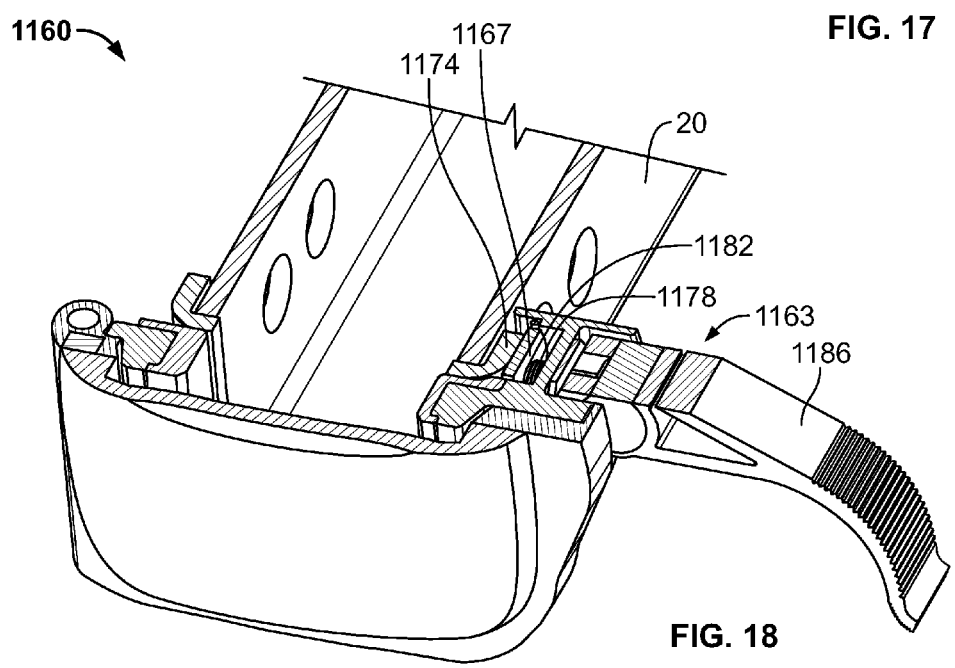
FIG. 18 is a cross-sectional view of embodiments of the anti-rattle device of FIG. 17 in a disengaged position with the cover in a closed position.
Figure 19:
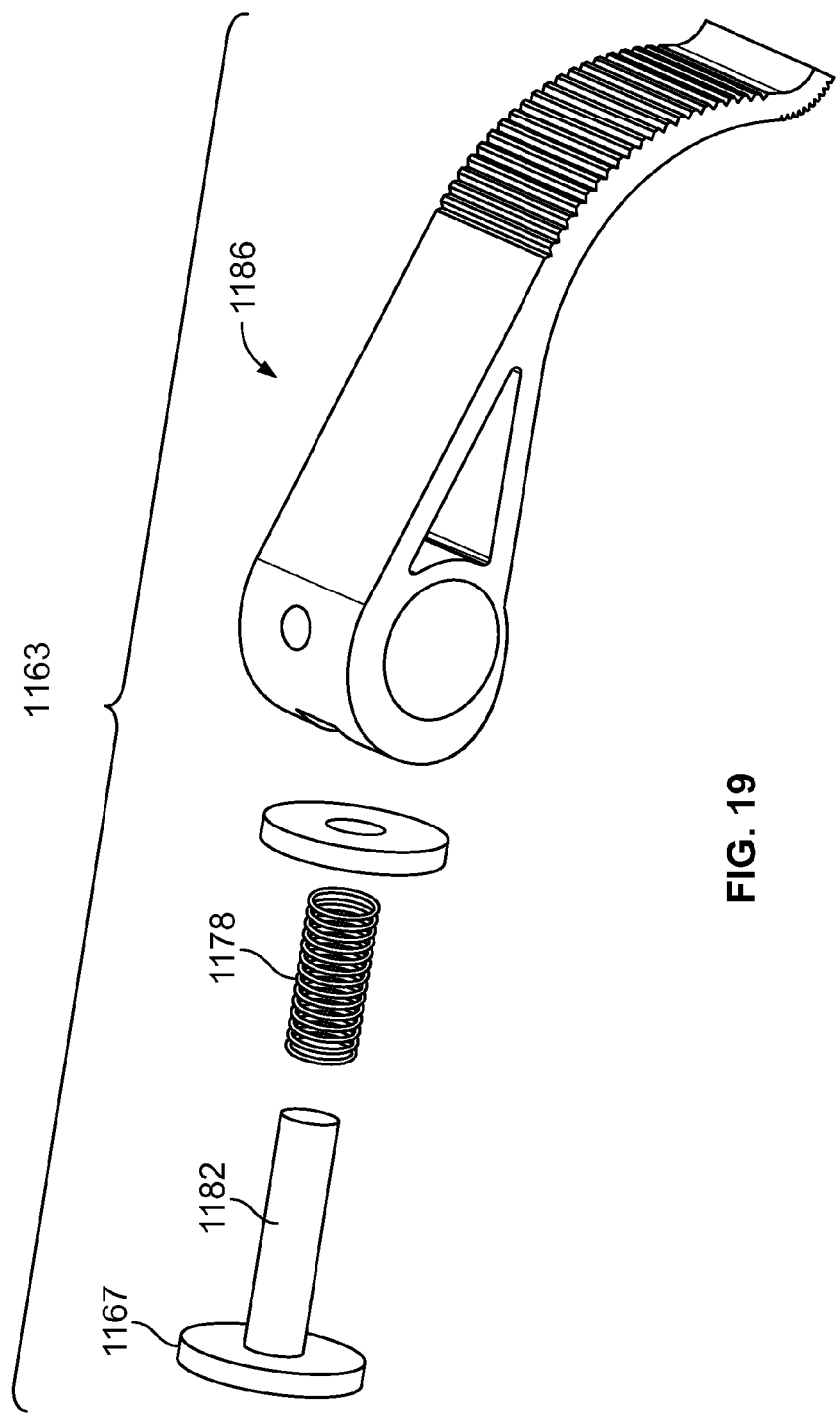
FIG. 19 is an exploded view of embodiments of a cam lever.

An anti-rattle device 1160 as shown in FIGS. 17-18 may be operatively attached with the receiver hitch 20 in any appropriate manner. The anti-rattle device 1160 may be of any appropriate configuration. The anti-rattle device 1160 may include a cam lever 1163 (such as shown in FIG. 19) having a plunger 1167 configured to extend towards the receiver hitch 20 during operation. In such embodiments, for example, movement of the cam lever 1163 from a disengaged position, as shown in FIG. 18, to an engaged position, as shown in FIG. 17. In such embodiments, receiver hitch 20 may include a reinforcement ring 1174 that may be attached with the receiver hitch 20 in any appropriate manner. By way of a non-limiting example, the reinforcement ring 1174 may be formed from steel or any other structural material and may be welded, adhered, fastened, snap fit, friction fit or otherwise attached with the receiver hitch 20 in any appropriate manner. Further, the reinforcement ring 1174 may be integrally or monolithically formed with the receiver hitch 20 in any appropriate manner.

The cam lever 1163 may further include a biasing member 1178 of any appropriate configuration, including, without limitation being a coil spring or elastomer. The cam lever 1163 may further include a shaft 1182 and a handle 1186. The biasing member 1178 may be formed of any appropriate material, including, without limitation metal or plastic. The biasing member 1178 may circumscribe or otherwise operatively engage the shaft 1182 in any appropriate manner. The biasing member 1178 may be positioned between the plunger 1167 and handle 1186. This biasing member 1178 may apply a load to the cam lever 1163. For example, the biasing member 1178 may apply a biasing force against the shaft 1182 or plunger 1167 of the cam lever 1163. This load may maintain the handle 1186 of the cam lever 1163 in a predetermined position, such as when the draw bar 48 is not inserted into the receiver hitch 20 and the anti-rattle device 1160 is engaged with the receiver hitch 20. Further, the biasing member 1178 may operatively engage the plunger 1167 against the reinforcement ring 1174. This engagement may apply a force against the receiver hitch 20 so that relative movement between the receiver hitch 20 and the draw bar 48 is minimized or even eliminated. Eliminating the relative movement may generally eliminate the rattling that may otherwise be present. This may eliminate the necessity of an adjustable portion within the cam lever 1163. The adjustment may be designed into the biasing member 1178. The appropriate shape, size and force applied by the biasing member 1178 may be changed to apply the appropriate amount of force against the receiver hitch 20 via the plunger 1167 in an effort to generally minimize movement between the receiver hitch 20 and draw bar 48. Adjusting the biasing member 1178 may account for different tolerances or variations of the draw bar 48, receiver hitch 20 or the like.

In some embodiments, the shaft 1182 may be adjustable relative to either of the handle 1186, the plunger 1167 or both. The adjustability of the shaft 1182 may account for different tolerances or variations of the draw bar 48, receiver hitch 20 or the like. Further, the adjustability of the shaft 1182 may adjust forces applied during operation. The shaft 1182 may be adjustable in any appropriate manner. In some embodiments, the shaft 1182 may be adjustable relative to the handle 1182 such that it may operatively move inward or outward from the handle 1186.

The handle 1186 may be actuated from a disengaged position as shown in FIG. 18 to the engaged position in FIG. 17. The handle 1186 may be of a configuration that allows a user to grasp the handle 1186 easily and position it to and from the engaged and disengaged positions. The handle 1186 may be formed of any appropriate material, including, without limitation, metal, plastic or a combination of such.

Figure 20:
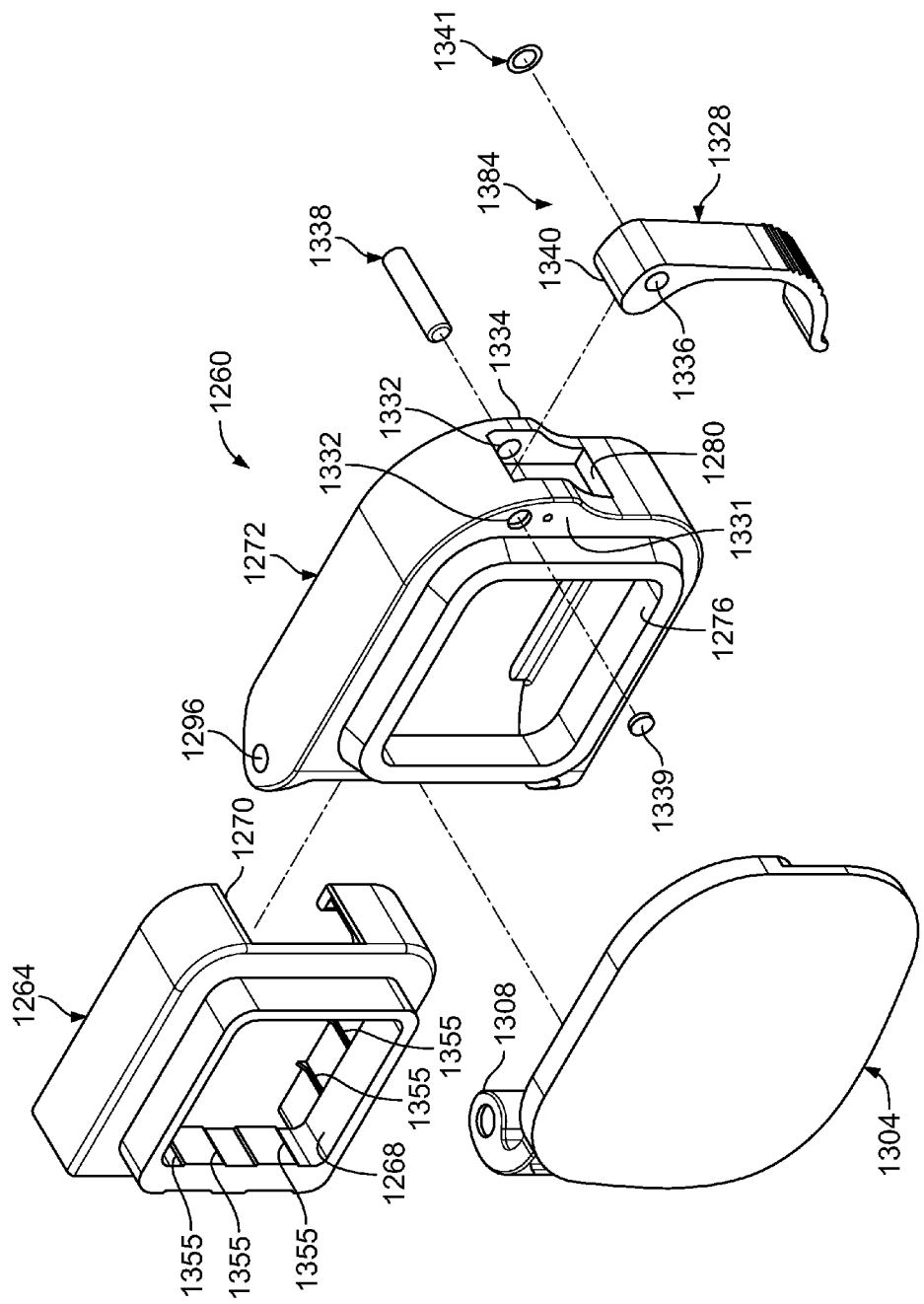
FIG. 20 is an exploded view of embodiments of an anti-rattle device.

As shown in FIG. 20, an anti-rattle device 1260 may be operatively engaged with the receiver hitch 20 in any appropriate manner. In some embodiments, the anti-rattle device 1260 when operatively engaged with the receiver hitch 20 may apply a force against the exterior portion 36 of the receiver hitch 20 so that relative movement between the receiver hitch 20 and the draw bar 48 is minimized or even eliminated. Eliminating the relative movement may generally eliminate the rattling that may otherwise be present. This may reduce the perceptible noise to the operator during operation and may reduce the wear on the draw bar 48 and receiver hitch 20.

The anti-rattle device 1260 may be of any appropriate configuration. In some embodiments, and as shown in more detail in FIG. 20, the anti-rattle device 1260 may include an isolator 1264 of any appropriate shape and size. The isolator 1264 may be made any suitable material, including, by way of a non-limiting example an elastomeric material such as rubber. The isolator 1264 may be operatively secured to the receiver hitch 20 by any appropriate manner. By way of a non-limiting example, the isolator 1264 may be telescopingly engaged with the receiver hitch 20 and fastened, snap-fit, welded, adhered or the like thereto.

The isolator 1264 may include an opening 1268 of such a shape and size that may generally be similar to that of the receiver opening 32. The opening 1268 may further be of a shape and size such that the draw bar 48 may be telescopingly inserted therethrough. Further, the isolator 1264 may include a cut-out portion 1270. In some embodiments, the isolator may include cut-out portions 1270 on opposed sides of the isolator 1264. The cut-out portion 1270 may be integrally formed with the isolator 1264 or may be formed through a subsequent operation. The cut-out portion 1270 may be of a shape and size to provide clearance for certain components of the anti-rattle device 1260 described in more detail below.

The anti-rattle device 1260 may further include a frame 1272. The frame 1272 may be layered upon the isolator 1264, i.e., the frame 1272 may telescopingly engage with the isolator 1264. Further, the frame 1272 may be secured to the receiver hitch 20 by any appropriate manner, including, without limitation, being fastened, snap-fit, welded, adhered or the like. The frame 1272 may be made of any appropriate material, including, without limitation of steel, plastic, metal, elastomeric materials, or any other suitable material. The frame 1272 may include an opening 1276 of such a shape and size that may generally be similar to that of the receiver opening 32 and/or the opening 1268 of the isolator 1264; provided, however, the teachings are not limited to this configuration. The openings 32, 1268, and 1276 may be different shapes and sizes. The opening 1276 may further be of a shape and size such that the draw bar 48 may be telescopingly inserted therethrough. Further, the frame 1272 may be configured to telescopingly engage the draw bar 48. The present teachings are not limited to the configuration shown.

Frame 1272 may further include a cam slot 1280 of any appropriate shape and size. The cam slot 1280 may be of a configuration to receive a cam assembly 1284. The cam slot 1280 may be positioned on the frame 1272 in any appropriate location. While the cam slot 1280 is shown as being on a side portion 1288 of the frame 1272, the present teachings are not limited to such. By way of a non-limiting example, the cam slot 1280 may be positioned on a top or bottom portion of the frame 1276, on an opposed side of the frame 1272 from that shown, or may be located on any of such positions or all of such positions.

The frame 1272 may further include a pin aperture 1296 on any appropriate position on the frame 1272. The pin aperture 1296 may be of any appropriate configuration. By way of a non-limiting example, the pin aperture 1296 may be configured to receive a cover pin as described in more detail below.

The anti-rattle device 1260 may further include a cover 1304. The cover 1304 may be made of any appropriate material, including, without limitation elastomeric material, plastic, rubber, metal or any other suitable material. Additionally, the cover 1304 may be integrated with a logo, indicia, design, reflector, lights, or other embellishment as described in more detail below. The cover 1304 may be moveably engaged with the frame 1272 in any appropriate manner. In some embodiments, the cover 1304 may include a sleeve 1308 of any appropriate configuration—such as of a configuration to receive a cover pin (not shown). In such embodiments, the cover 1304 may be pivotally attached to the frame 1272. The cover 1304 may be aligned with the frame 1272 such that the pin aperture 1296 is generally aligned with the sleeve 1308. The cover pin may be inserted in and through the pin aperture 1296 and sleeve 1308. This may result in the cover 1304 being pivotally attached with the frame 1272. It should be understood, however, that the cover 1304 may be attached with the frame 1272 in any appropriate manner and is not limited to that shown and described herein. By way of a non-limiting example, the cover 1304 may be tethered with the frame 1272.

The anti-rattle device 1260 may include the cam assembly 1284 operatively engaged with the frame 1272 previously noted above. The cam assembly 1284 may include a cam lever 1328 pivotally engaged with the frame 1272 in any appropriate manner. The frame 1272 may include an aperture 1332 adjacent to, in, or in close proximity to the slot 1280. As shown in FIG. 20, the aperture 1332 may be positioned on each side 1334 of the slot 1280. The cam lever 1328 may include an aperture 1336. The apertures 1336 and 1332 may be of substantially identical size and may be generally aligned when the cam lever 1328 is operatively positioned relative to the frame 1272.

A pin 1338 may be inserted into and through apertures 1332 and 1336. This may pivotally engage the cam lever 1328 with the frame 1272. By way of a non-limiting example, the pin 1338 may be press-fit into the apertures 1332 and 1336 and an O-ring 1341 may be positioned adjacent to the cam lever 1328 and the side portion 1334 of the slot 1280. The O-ring 1341 may be generally aligned with the apertures 1332 and 1336 such that the pin 1338 may be inserted therein. While the pin 1338 is shown and described, any fastening device may be utilized to pivotally engage the cam lever 1328 with the frame 1272. A cover 1339 may be inserted into one of the apertures 1332 to provide a more aesthetically pleasing finish.

The cam lever 1328 may further include a camming surface 1340 that may be selectively engageable directly with the receiver hitch 20 or more specifically with the reinforcement ring of the receiver hitch 20 as further described below. The camming surface 1340 may be of any appropriate configuration and is not limited to that shown and described.

The cam lever 1328 may be rotated relative to the frame 1272 such that rotation of the cam lever 1328 may rotate the camming surface 1340 into and through the slot 1280. This rotation may operably position the amount of engagement of the cam engaging assembly 1284 relative the receiver hitch 20. Further, the cam lever 1328 or more specifically, the cam assembly 1284, may be offset higher relative to the frame 1272, i.e., the cam assembly 1284 of such embodiments may be positioned at a higher location than other embodiments.

In operation, the operator may secure the anti-rattle device 1260 with the receiver hitch 20. The operator may insert the draw bar 48 into and through the openings 32, 1268, and 1276. Although, it should be understood that in some embodiments, the operator may insert the draw bar 48 into the receiver hitch 20 and then operatively secure the anti-rattle device 1260. The present teachings are not limited to a specific order of attachment. The operator may manually actuate the cam lever 1328 from a first position to a second position. Upon such actuation of the cam lever 1328, the camming surface 1340 may apply a force against the receiver hitch 20 or more specifically against the reinforcement ring of the receiver hitch 20, which may also apply a force against the isolator 1264 causing the draw bar 48 to deflect. This force may minimize or eliminate relative movement between the receiver hitch 20 and the draw bar 48. Eliminating or minimizing the relative movement may generally eliminate the rattling that may otherwise be present resulting in the dampening of noise that may otherwise occur during operation of the vehicle 24.

The isolator 1264 may be made of material such that it may act to dampen relative movement between the draw bar 48 and receiver hitch 20. This may further generally eliminate the rattling that may otherwise be present. In such embodiments, the camming surface 1340 of the cam lever 1328 is acting directly on the receiver hitch 20 (such as the reinforcement ring thereof), there may be no need for an adjustable piece. The adjustment necessary may be designed into the isolator 1264 so that it will achieve two things, take up all of the variations of the draw bar 48 and receiver hitch 20 and apply a load to reduce rattle.

The isolator 1264 of these embodiments may have a generally thicker portion than other isolators. By way of a non-limiting example, side portions of the isolator 1264 may be thicker than the top and/or bottom portion. This thicker portion of the isolator 1264 may provide the adjustability noted above. Further, the durometer of the isolator 1264 may be specifically selected to provide the appropriate amount of force, which may allow for the appropriate adjustability, i.e., the appropriate durometer of the isolator 1264 may be chosen relative to the amount of deflection necessary to achieve the anti-rattle feature. By way of a non-limiting example, deflection of 30%-40% of the isolator 1264 may provide sufficient force to generally prevent rattling while provide suitable adjustability to account for the tolerances of the receiver hitch 20 and/or draw bar 48.

The isolator 1264 may further include a plurality of nubs 1355. It should be understood that any appropriate number of nubs 1335 may be used without departing from the present teachings. The nubs 1335 may be positioned at any appropriate location on the isolator 1264. The nubs 1335 may provide additional stiffness to the isolator 1264, especially after prolonged use thereof. The nubs 1335 may provide sufficient rigidity to the isolator 1264 such that after extensive deflection of the isolator 1264, the nubs 1335 contribute enough rigidity that the isolator 1264 will continue to deflect appropriately enough to provide the required adjustability and anti-rattle feature.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. An anti-rattle device comprising:
a frame configured to engage a receiver hitch and to receive a draw bar;
an isolator in communication with the frame; and
a cam lever operatively engaged with the frame;
wherein the cam lever is selectively positionable between disengaged and engaged positions whereby the cam lever is adapted to deflect the isolator between the draw bar and the receiver hitch in the engaged position.

2. The anti-rattle device of claim 1, wherein the frame includes an opening and a portion of the draw bar is capable of being inserted through the opening.

3. The anti-rattle device of claim 1, wherein the frame circumscribes the isolator and the isolator is configured to dampen movement between the receiver hitch and draw bar.

4. The anti-rattle device of claim 3, wherein the isolator is formed of a generally elastomeric material.

5. The anti-rattle device of claim 3, wherein the isolator engages either of the receiver hitch and draw bar.

6. The anti-rattle device of claim 3, wherein the isolator includes at least one nub positioned on the isolator.

7. The anti-rattle device of claim 6, wherein the at least one nub provides additional stiffness to the isolator.

8. The anti-rattle device of claim 6, wherein the at least one nub provides rigidity to the isolator.

9. The anti-rattle device of claim 1, wherein the frame includes a cam aperture.

10. The anti-rattle device of claim 9, wherein the cam lever mount operatively inserted into the cam aperture of the frame comprises:
the cam lever pivotally attached with the cam lever mount; and
a plunger operatively engaged by the cam lever and selectively positionable relative to the cam lever mount.

11. The anti-rattle device of claim 10, wherein the plunger is configured to selectively engage the draw bar.

12. The anti-rattle device of claim 10, wherein the plunger is configured to selectively engage the receiver hitch.

13. The anti-rattle device of claim 10, wherein the cam aperture is threaded.

14. The anti-rattle device of claim 13, wherein the cam lever mount is threadingly engaged with the cam aperture and selectively positionable relative the cam aperture.

15. The anti-rattle device of claim 10, wherein the cam lever is positionable between first and second positions, whereby when the cam lever is in the first position the cam lever is in the disengaged position and when the cam lever is in the second position the cam lever is in the engaged position.

16. The anti-rattle device of 15, wherein the plunger is configured to engage the receiver hitch when the cam lever is the second position causing the draw bar to engage against the hitch receiver.

17. The anti-rattle device of claim 16, wherein the receiver hitch engaging against the draw bar generally minimizes a relative movement between the draw bar and hitch receiver.

18. The anti-rattle device of claim 17, wherein minimizing the relative movement between the receiver hitch and draw bar generally eliminates rattling between the draw bar and receiver hitch.

19. The anti-rattle device of claim 1, further comprising a cover pivotally attached with the frame.

20. The anti-rattle device of claim 19, wherein the cover includes at least one of a light, reflector or indicia.

21. The anti-rattle device of claim 19, wherein the cover includes a four-way adapter holder configured to engage a four-way electrical connector of a towing vehicle.

22. A system comprising:
a receiver hitch configured to be attached with a vehicle;
a draw bar telescopingly engaged with the receiver hitch; and
an anti-rattle device engaged with the receiver hitch, the anti-rattle device comprising:
a frame telescopingly engaging the receiver hitch, the frame having an opening receiving the draw bar;
an isolator; and
a cam lever operatively engaged with the frame;
wherein the cam lever is positionable between disengaged and engaged positions and a cam engaging assembly deflects the isolator between the draw bar and the hitch receiver in the engaged position.

23. The system of claim 22, wherein the frame includes an opening and a portion of the draw bar is inserted through the opening.

24. The system of claim 22, wherein a cam lever mount operatively inserted into a cam aperture of the frame comprises:
the cam lever pivotally attached with the cam lever mount; and
a plunger operatively engaged by the cam lever and selectively positionable relative to the cam lever mount.

25. The system of claim 24, wherein the cam lever is pivotable between first and second positions, whereby the cam lever in the second position engages the plunger against at least one of the draw bar and receiver hitch.

26. The system of claim 24, wherein the cam lever mount is threadingly engaged with the cam aperture and selectively positionable relative the cam aperture.

27. The system of claim 26, wherein the cam lever is rotatable to threadably position the cam lever mount relative the cam aperture.

28. An anti-rattle device comprising:
a frame configured to engage a receiver hitch and to receive a draw bar;
an isolator configured to engage the receiver hitch, wherein the frame circumscribes the isolator and the isolator is configured to dampen movement between the draw bar and receiver hitch; and
a cam lever operatively secured with the frame, the cam lever positionable between disengaged and engaged positions whereby at least a portion of the cam lever is engageable with the receiver hitch deflecting the isolator between the draw bar and receiver hitch in the engaged position.

29. The anti-rattle device of claim 28, wherein the cam lever comprises:
a handle pivotally attached with the frame; and a plunger operatively engaged by the handle and selectively positionable relative to the receiver hitch.

30. The anti-rattle device of claim 29, wherein the plunger includes a shaft having an adjustable length.

31. The anti-rattle device of claim 30, wherein the shaft is laterally adjustable relative to the handle and receiver hitch.

32. The anti-rattle device of claim 28, further comprising a biasing member positioned between plunger and the handle, the biasing member applying a load against the handle to maintain the handle in a predetermined position.

33. The anti-rattle device of claim 28, wherein the cam lever includes a handle pivotally attached with the frame.

34. The anti-rattle device of claim 33, wherein a slot is positioned in the frame and the cam lever is operatively engaged with the slot.

35. The anti-rattle device of claim 28, wherein the isolator includes a thicker portion.

36. The anti-rattle device of claim 35, wherein the cam lever includes a camming surface, whereby the camming surface is selectively engageable with the receiver hitch causing deflection of the thicker portion of the isolator between the receiver hitch and draw bar in the engaged position.

37. The anti-rattle device of claim 28, wherein the isolator is formed of an elastomeric material providing adjustability of the cam lever relative to the receiver hitch.

38. An anti-rattle device comprising:
 a frame configured to engage a receiver hitch and to receive a draw bar;
 an isolator configured to engage the receiver hitch; and
 a cam lever operatively engaged with the frame,
 wherein the cam lever is selectively positionable between disengaged and engaged positions whereby the cam lever is engageable with the receiver hitch deflecting the isolator between the draw bar and receiver hitch in the engaged position.

* * * * *